(12) United States Patent
Hara

(10) Patent No.: US 11,843,135 B2
(45) Date of Patent: Dec. 12, 2023

(54) METHOD FOR MANUFACTURING SECONDARY BATTERY AND SECONDARY BATTERY ASSEMBLY

(71) Applicant: PRIME PLANET ENERGY & SOLUTIONS, INC., Tokyo (JP)

(72) Inventor: Takeru Hara, Toyota (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 0 days.

(21) Appl. No.: 17/678,458

(22) Filed: Feb. 23, 2022

(65) Prior Publication Data

US 2022/0294092 A1    Sep. 15, 2022

(30) Foreign Application Priority Data

Mar. 12, 2021  (JP) ................................ 2021-039915

(51) Int. Cl.
*H01M 50/627*  (2021.01)
*H01M 50/131*  (2021.01)
*H01M 10/0587*  (2010.01)

(52) U.S. Cl.
CPC ..... *H01M 50/627* (2021.01); *H01M 10/0587* (2013.01); *H01M 50/131* (2021.01)

(58) Field of Classification Search
CPC ............ H01M 50/627; H01M 50/131; H01M 50/132; H01M 10/0587; H01M 10/04
See application file for complete search history.

(56) References Cited

U.S. PATENT DOCUMENTS

| 2013/0247364 A1* | 9/2013 | Fukatsu ............ H01M 10/0404 29/730 |
| 2015/0072184 A1 | 3/2015 | Kusunoki et al. |
| 2015/0194651 A1 | 7/2015 | Urano et al. |
| 2017/0018797 A1 | 1/2017 | Murashi et al. |

FOREIGN PATENT DOCUMENTS

| CN | 103325989 A | 9/2013 |
| CN | 104396053 A | 3/2015 |
| EP | 3 291 346 A1 | 3/2018 |

(Continued)

*Primary Examiner* — Kenneth J Douyette
(74) *Attorney, Agent, or Firm* — Finnegan, Henderson, Farabow, Garrett & Dunner, LLP

(57) ABSTRACT

Provided is a technique capable of improving impregnation efficiency of a nonaqueous electrolyte into an electrode body. A manufacturing method herein disclosed includes producing a negative pressure in an inside of a battery case; introducing a nonaqueous electrolyte into the inside of the battery case; establishing communication between the inside of the battery case and external atmosphere; temporarily sealing a solution introduction port using a first sealing member, impregnating the electrode body with a nonaqueous electrolyte; opening the solution introduction port; and, sealing the solution introduction port using a second sealing member. Herein, the first sealing member includes an air permeable film. Air permeation is enabled between the inside of the battery case after the temporary sealing and external atmosphere. The permeability of a vapor derived from the nonaqueous electrolyte with respect to the film is smaller than the permeability of water vapor.

5 Claims, 6 Drawing Sheets

(56) References Cited

FOREIGN PATENT DOCUMENTS

| | | |
|---|---|---|
| JP | 2002-280059 A | 9/2002 |
| JP | 2007-257942 A | 10/2007 |
| JP | 2012-134047 A | 7/2012 |
| JP | 2014-116179 A | 6/2014 |
| JP | 2015-056324 A | 3/2015 |
| JP | 2015-099658 A | 5/2015 |
| JP | 2018-037346 A | 3/2018 |
| JP | 2018-106816 A | 7/2018 |
| JP | 2019-087376 A | 6/2019 |
| WO | WO 2014/033822 A1 | 3/2014 |
| WO | WO 2017/013718 A1 | 1/2017 |

* cited by examiner

METHOD FOR MANUFACTURING SECONDARY BATTERY AND SECONDARY BATTERY ASSEMBLY

CROSS REFERENCE TO RELATED APPLICATIONS

The present application claims the priority based on Japanese Patent Application No. 2021-039915 filed on Mar. 12, 2021, the entire contents of which are incorporated by reference in the present specification.

BACKGROUND OF THE DISCLOSURE

1. Technical Field

The present invention relates to a method for manufacturing a secondary battery and a secondary battery assembly.

2. Background

Currently, a secondary battery such as a lithium ion secondary battery or a nickel hydrogen battery has been widely used in various fields of a vehicle, a portable terminal, and the like. As one example of this kind of secondary battery, mention may be made of the one with a configuration including an electrode body having a positive electrode and a negative electrode, a nonaqueous electrolyte, and a battery case for accommodating the electrode body and the nonaqueous electrolyte therein. The battery case is typically provided with a solution introduction port for introducing a nonaqueous electrolyte. A method for manufacturing the secondary battery can include, for example, accommodating the electrode body in the battery case; and introducing the nonaqueous electrolyte into the battery case including the electrode body accommodated therein (solution introducing step). Thus, in the manufacturing process of a secondary battery, it is possible to construct a secondary battery assembly including an electrode body, a nonaqueous electrolyte, and a battery case.

For example, the solution introducing step described in Japanese Patent Application Publication No. 2018-106816 includes a first solution introducing step of starting introduction of an electrolyte with the inside of the battery case under reduced pressure, and stopping solution introduction with at least a part of the electrode body immersed in the electrolyte; a solution surface lowering step of increasing the atmospheric pressure in the battery case, and lowering the solution surface of the electrolyte; and a second solution introducing step of restarting introduction of the electrolyte, and introducing the electrolyte in a prescribed amount or to a prescribed height. There is a description to the effect that the manufacturing method having such a configuration can shorten the time required for the solution introducing step.

SUMMARY OF THE INVENTION

Incidentally, it is desired that the nonaqueous electrolyte introduced in the battery case is impregnated into the electrode body with more efficiency.

The present invention was completed in order to solve such a problem. It is an object of the present invention to provide a technology capable of improving the impregnation efficiency of the nonaqueous electrolyte into the electrode body of a secondary battery assembly at the time of manufacturing a secondary battery.

The method for manufacturing a secondary battery herein disclosed is a method for manufacturing a secondary battery including: an electrode body having a positive electrode and a negative electrode; a nonaqueous electrolyte; and a battery case for accommodating the electrode body and the nonaqueous electrolyte therein, and having a solution introduction port for introducing the nonaqueous electrolyte. The manufacturing method includes: producing a negative pressure in an inside of the battery case with the electrode body accommodated in the battery case; introducing the nonaqueous electrolyte into the inside of the battery case via the solution introduction port with the inside of the battery case under a negative pressure; establishing communication between the inside of the battery case and external atmosphere after introducing the nonaqueous electrolyte; temporarily sealing the solution introduction port using a first sealing member after the communication; impregnating the electrode body with at least a part of the nonaqueous electrolyte with the solution introduction port temporarily sealed; removing the first sealing member, and opening the solution introduction port; and sealing the solution introduction port using a second sealing member. Herein, the first sealing member includes an air permeable film having air permeability. Air permeation is enabled between the inside of the battery case after the temporary sealing and external atmosphere via the air permeable film. The permeability of a vapor derived from the nonaqueous electrolyte with respect to the air permeable film is smaller than the permeability of water vapor with respect to the air permeable film.

With the manufacturing method having such a configuration, using the first sealing member having the air permeable film as described above, the solution introduction port of the battery case after introducing the nonaqueous electrolyte is temporarily sealed. The air permeable film has air permeability. For this reason, air permeation is enabled between the battery case inside and external atmosphere. As a result of this, it is possible to improve the impregnation efficiency of the nonaqueous electrolyte into the electrode body. Further, the air permeable film is hard for the vapor derived from the nonaqueous electrolyte to permeate. For this reason, it is possible to suppress volatilization of the nonaqueous electrolyte to the outside during impregnation of the electrode body with the nonaqueous electrolyte.

In accordance with one preferable aspect of the manufacturing method herein disclosed, the first sealing member has a sealing stopper main body having a through hole, and the air permeable film. The air permeable film blocks the through hole of the sealing stopper main body. By using the sealing stopper having such a configuration as the first sealing member, it is possible to more facilitate detachment and attachment of the first sealing member in addition to the foregoing effect. Further, it is possible to reuse the air permeable film (sealing stopper).

In accordance with another preferable aspect of the manufacturing method herein disclosed, the positive electrode is a long band-shaped positive electrode sheet, and the negative electrode is a long band-shaped negative electrode sheet. The electrode body is a wound electrode body including the positive electrode sheet and the negative electrode sheet stacked one on another with a separator interposed therebetween, and wound around a winding axis orthogonal to a sheet longitudinal direction as a center. Herein, a lamination surface of the positive electrode sheet, the negative electrode sheet, and the separator is opened from both ends in the winding axis direction to outside of the electrode body. The nonaqueous electrolyte can be impregnated in the wound electrode body via the opened lamination surface.

This has resulted in a higher demand for the improvement of the impregnation efficiency of the nonaqueous electrolyte in the method for manufacturing a secondary battery including a wound electrode body. The effects of the technology herein disclosed can be preferably exhibited in the method for manufacturing a secondary battery including a wound electrode body.

In accordance with a still other preferable aspect of the manufacturing method herein disclosed, the air permeable film includes at least one resin material selected from the group consisting of polyethylene, polypropylene, polyphenylene sulfide, and polytetrafluoroethylene. A film obtained using the resin material has low permeability of the vapor derived from the nonaqueous electrolyte therethrough while having air permeability. For this reason, the resin material is preferable for achieving the effects of the technology herein disclosed.

Further, when a secondary battery is manufactured using the manufacturing method herein disclosed, the secondary battery assembly having the following configuration is provided. The secondary battery assembly includes: an electrode body having a positive electrode and a negative electrode; a nonaqueous electrolyte; and a battery case for accommodating the electrode body and the nonaqueous electrolyte therein, and having a solution introduction port for introducing the nonaqueous electrolyte. An air permeable film having air permeability and/or a residue of the air permeable film is present at the solution introduction port and/or therearound. The permeability of a vapor derived from the nonaqueous electrolyte with respect to the air permeable film is smaller than a permeability of water vapor with respect to the air permeable film. With such a configuration, it is possible to improve the impregnation efficiency of the nonaqueous electrolyte into the electrode body. Further, it is possible to suppress the volatilization of the nonaqueous electrolyte to the outside during impregnation of the electrode body with the nonaqueous electrolyte.

In accordance with another preferable aspect of the secondary battery assembly herein disclosed, the positive electrode is a long band-shaped positive electrode sheet, and the negative electrode is a long band-shaped negative electrode sheet. The electrode body is a wound electrode body including the positive electrode sheet and the negative electrode sheet stacked one on another with a separator interposed therebetween, and wound around a winding axis orthogonal to a sheet longitudinal direction as a center. Herein, a lamination surface of the positive electrode sheet, the negative electrode sheet, and the separator is opened from both ends in the winding axis direction to outside of the electrode body. The effects of the technology herein disclosed are preferably exhibited with the method for manufacturing a secondary battery having a wound electrode body.

In accordance with a still other preferable aspect of the secondary battery assembly herein disclosed, the air permeable film includes at least one resin material selected from the group consisting of polyethylene, polypropylene, polyphenylene sulfide, and polytetrafluoroethylene. The resin material is preferable for implementing the effects of the technology herein disclosed.

DETAILED DESCRIPTION OF THE PREFERRED EMBODIMENT

Below, referring to the accompanying drawings, some preferable embodiments of the technology herein disclosed will be described. Incidentally, matters necessary for executing the present invention, except for matters specifically referred to in the present specification (e.g., each general configuration and manufacturing process of a secondary battery, and a secondary battery assembly in a manufacturing step not characterizing the technology herein disclosed) can be grasped as design matters of those skilled in the art based on the related art in the present field. The technology herein disclosed can be executed based on the contents disclosed in the present specification, and the technical common sense in the present field.

In the present specification, the term "secondary battery" is a term denoting an electric storage device capable of repeatedly charging and discharging in general, and is a concept including a so-called storage battery (chemical battery) such as a lithium ion secondary battery or a nickel hydrogen battery, and a capacitor (physical battery) such as an electric double layer capacitor.

A reference sign X in each drawing referred to in the present specification represents the "depth direction", a reference sign Y represents the "width direction", and a reference sign Z represents the "height direction". Further, F in the depth direction X represents the "front", and Rr represents the "rear". L in the width direction Y represents the "left", and R represents the "right". Then, U in the height direction Z represents the "up", and D represents the "down". However, these are merely the direction for convenience of description, and should not be construed as limiting the setting form of the secondary battery and the secondary battery assembly in the manufacturing step at all. Further, the expression "A to B" indicating the numerical value range in the present specification also includes the meaning of "more than A, and less than B" together with the meaning of "A or more and B or less".

First Embodiment

Figure 1:
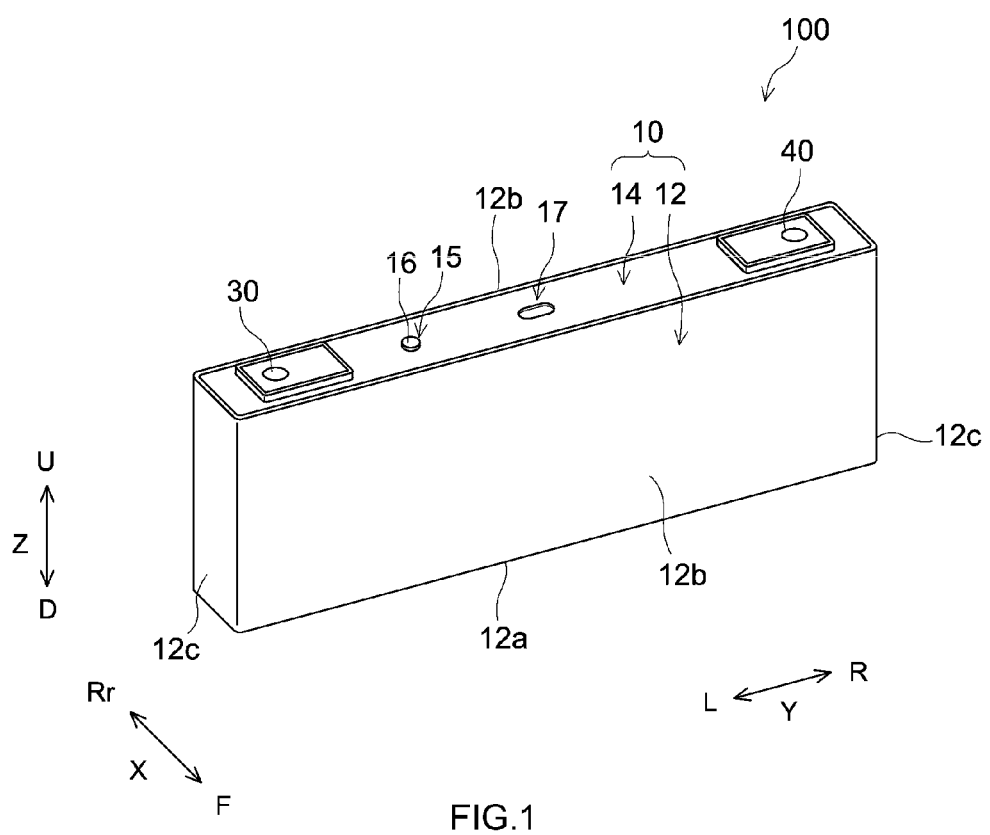
FIG. 1 is a perspective view schematically showing a secondary battery manufactured by a manufacturing method in accordance with First Embodiment.

On example of the secondary battery obtained by carrying out the manufacturing method herein disclosed is shown in FIG. 1. FIG. 1 is a perspective view schematically showing a secondary battery manufactured by the manufacturing method in accordance with First Embodiment. A secondary battery 100 includes an electrode body and an electrolyte not shown, and a battery case 10 for accommodating the electrode body and the electrolyte therein. The secondary battery 100 is herein a lithium ion secondary battery.

The battery case 10 includes a case main body 12 having an opening, and a lid body 14 for blocking the opening. The battery case 10 is integrated, and is hermetically sealed (closed) by joining the lid body 14 to the periphery of the opening of the case main body 12. The lid body 14 is provided with a solution introduction port 15, a safety valve 17, a positive electrode external terminal 30, and a negative electrode external terminal 40. The solution introduction port 15 is a hole for introducing an electrolyte into the battery case 10, and is sealed with a sealing member 16 (a second sealing member described later). The safety valve 17 is a thin-walled part configured so as to rupture when the pressure in the battery case 10 becomes a prescribed value or higher, and to discharge the gas in the battery case 10 to the outside. The positive electrode external terminal 30 and the negative electrode external terminal 40 are electrically connected with the electrode body accommodated in the battery case 10.

The battery case 10 is formed in a hexahedral box shape, and has a rectangular bottom surface 12a, a pair of rectangular large width surfaces 12b, and a pair of rectangular small width surfaces 12c. The pair of large width surfaces 12b rise up from the two long sides of the bottom surface 12a, respectively. The pair of small width surfaces 12c rise up from the two short sides of the bottom surface 12a, respectively.

Although not particularly restricted, the battery case 10 is made of, for example, a metal. Examples of the metal material forming the battery case 10 may include aluminum, aluminum alloy, iron, and an iron alloy. Alternatively, the battery case 10 may include a heat resistant resin material such as a polyimide resin.

Figure 2:
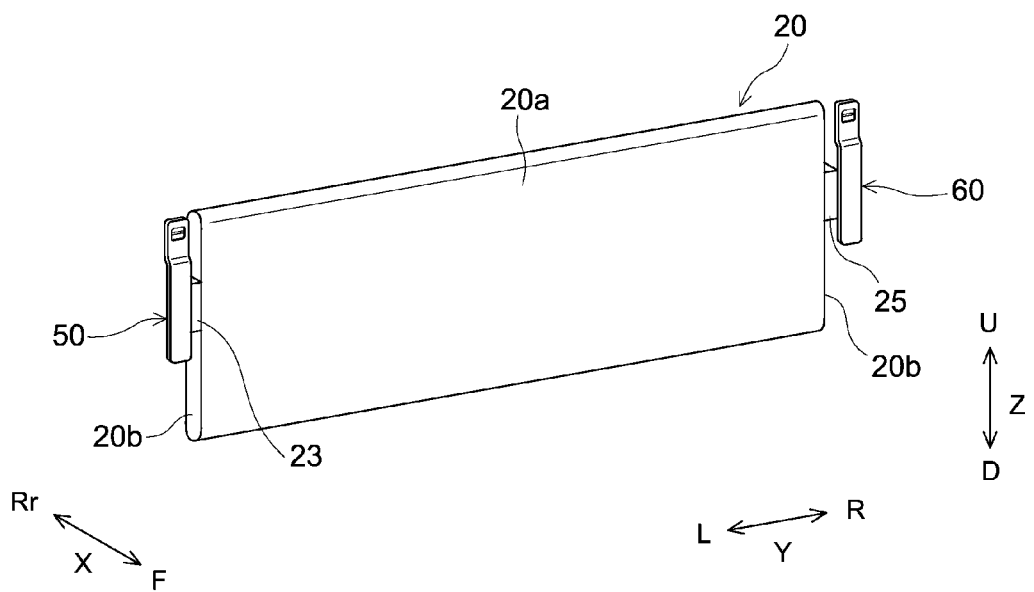
FIG. 2 is a perspective view schematically showing an electrode body for use in the manufacturing method in accordance with First Embodiment.
Figure 3:
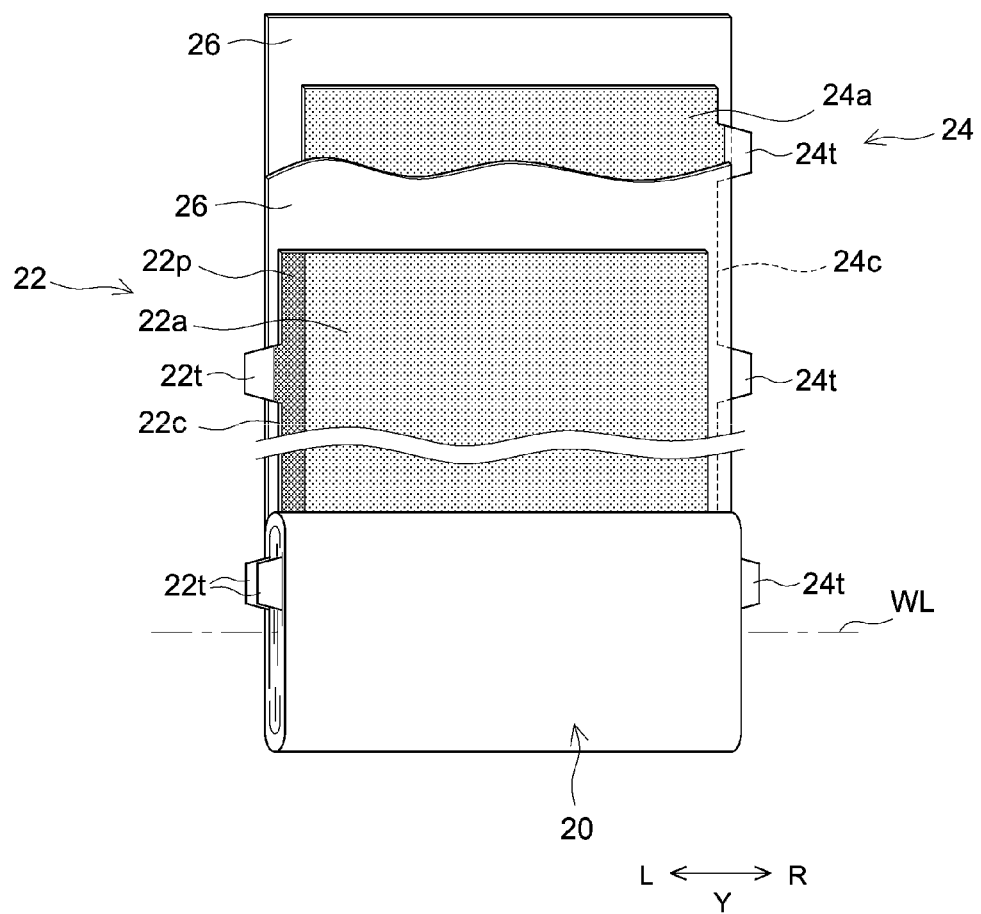
FIG. 3 is a schematic view showing a configuration of an electrode body for use in the manufacturing method in accordance with First Embodiment.

The electrode body is the power generating element of the secondary battery 100, and includes a positive electrode, a negative electrode, and a separator for separating the positive electrode and the negative electrode from each other. FIG. 2 is a perspective view schematically showing the electrode body for use in the manufacturing method in accordance with First Embodiment. FIG. 3 is a schematic view showing a configuration of the electrode body for use in the manufacturing method in accordance with First Embodiment. As shown in FIGS. 2 and 3, the electrode body 20 includes a positive electrode internal terminal 50 and a negative electrode internal terminal 60 mounted thereon. The positive electrode internal terminal 50 is connected with the positive electrode external terminal 30 (see FIG. 1). The negative electrode internal terminal 60 is connected with the negative electrode external terminal 40 (see FIG. 1).

As shown in FIG. 3, the electrode body 20 has a positive electrode 22 and a negative electrode 24. The electrode body 20 is herein a flat-shaped wound electrode body in which a long band-shaped positive electrode sheet 22 and a long band-shaped negative electrode sheet 24 are stacked one on another via the long band-shaped separator 26, and are wound around a winding axis WL orthogonal to the sheet longitudinal direction as the center. As shown in FIG. 2, the electrode body 20 has a pair of large width surfaces 20a and a pair of end faces 20b in the width direction Y. The end face 20b is the lamination surface of the positive electrode 22, the negative electrode 24, and the separator 26, and is opened to the outside of the electrode body 20.

Although not particularly shown, the electrode body 20 is arranged in the inside of the case main body 12 in the direction in which the winding axis WL is in parallel with the width direction Y. While being accommodated in the battery case 10 of FIG. 1, the pair of large width surfaces 20a of the electrode body 20 are opposed to the large width surfaces 12b of the battery case 10, respectively. Whereas, the pair of end faces 20b are opposed to the small width surfaces 12c, respectively.

The positive electrode sheet 22 has long band-shaped positive electrode collector foil 22c (e.g., aluminum foil), and a positive electrode active material layer 22a fixed on at least one surface of the positive electrode collector foil 22c. Although not particularly restricted, at one side edge in the width direction Y of the positive electrode sheet 22, if required, a positive electrode protective layer 22p may be provided. Incidentally, for the materials forming the positive electrode active material layer 22a or the positive electrode protective layer 22p, those for use in this kind of secondary battery (in the present embodiment, a lithium ion secondary battery) can be used without particular restriction. The materials do not characterize the technology herein disclosed, and hence, are herein not particularly described.

A plurality of positive electrode tabs 22t are provided at one end in the width direction Y of the positive electrode collector foil 22c (the left end of FIG. 3). The plurality of positive electrode tabs 22t respectively protrude toward one side in the width direction Y (the left side of FIG. 3). The plurality of positive electrode tabs 22t are provided at intervals (intermittently) along the longitudinal direction of the positive electrode sheet 22. The positive electrode tab 22t is a part of the positive electrode collector foil 22c, and is a part of the positive electrode collector foil 22c at which the positive electrode active material layer 22a and the positive electrode protective layer 22p are not formed (collector foil exposed part). The plurality of positive electrode tabs 22t are stacked at one end in the width direction Y (the left end of FIG. 3), and form a positive electrode tab group 23. The positive electrode tab group 23 is joined with the positive electrode internal terminal 50 (see FIG. 2).

The negative electrode sheet 24 has long band-shaped negative electrode collector foil 24c (e.g., copper foil), and a negative electrode active material layer 24a fixed on at least one surface of the negative electrode collector foil 24c. Incidentally, for the materials forming the negative electrode active material layer 24a, those for use in this kind of secondary battery (in the present embodiment, a lithium ion secondary battery) can be used without particular restriction. The materials do not characterize the technology herein disclosed, and hence will not be herein described in details.

A plurality of negative electrode tabs 24t are provided at one end in the width direction Y of the negative electrode collector foil 24c (the right end of FIG. 3). The plurality of negative electrode tabs 24t protrude toward one side in the width direction Y (the right side of FIG. 3). The plurality of negative electrode tabs 24t are provided at intervals (intermittently) along the longitudinal direction of the negative electrode sheet 24. The negative electrode tab 24t is herein a part of the negative electrode collector foil 24c, and is a part of the negative electrode collector foil 24c at which the negative electrode active material layer 24a is not formed (collector foil exposed part). The plurality of negative electrode tabs 24t are stacked at one end in the width direction Y (the right end of FIG. 3), and form a negative electrode tab group 25. The negative electrode tab group 25 is joined with the negative electrode internal terminal 60 (see FIG. 2).

Although not particularly restricted, the length in the width direction Y of the large width surface 20a of the electrode body 20 can be set at, for example, 80 mm or more, and may be 100 mm or more, 200 mm or more, 250 mm or more, or 300 mm or more. With an increase in the length, a longer time can be required for impregnation of a nonaqueous electrolyte into the electrode body. For this reason, the effect of the technology herein disclosed can be preferably exhibited even when the length satisfies the foregoing range. Incidentally, although the length has no particular restriction, the length can be set at, for example, 500 mm or less, 450 mm or less, or 400 mm or less.

The nonaqueous electrolyte typically includes a nonaqueous solvent and a support salt. As the nonaqueous solvent and the support salt, various solvents for use in the electrolyte of this kind of secondary battery (herein, a lithium ion secondary battery) can be used without particular restriction. Examples of the nonaqueous solvent may include various carbonates such as ethylene carbonate (EC), diethyl carbonate (DEC), dimethyl carbonate (DMC), and ethyl methyl carbonate (EMC). As the support salt, for example, a lithium salt such as $LiPF_6$ can be used. The nonaqueous electrolyte may include, if required, conventionally known additives such as a film forming agent; a thickener; and a dispersant.

Figure 4:
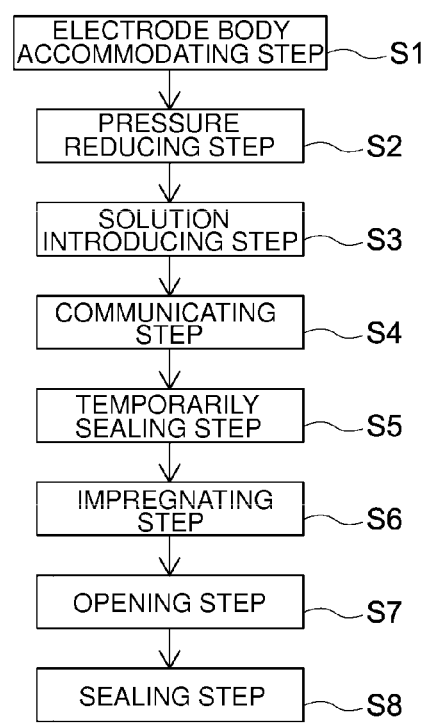
FIG. 4 is a process view of the manufacturing method in accordance with First Embodiment.
Figure 5:
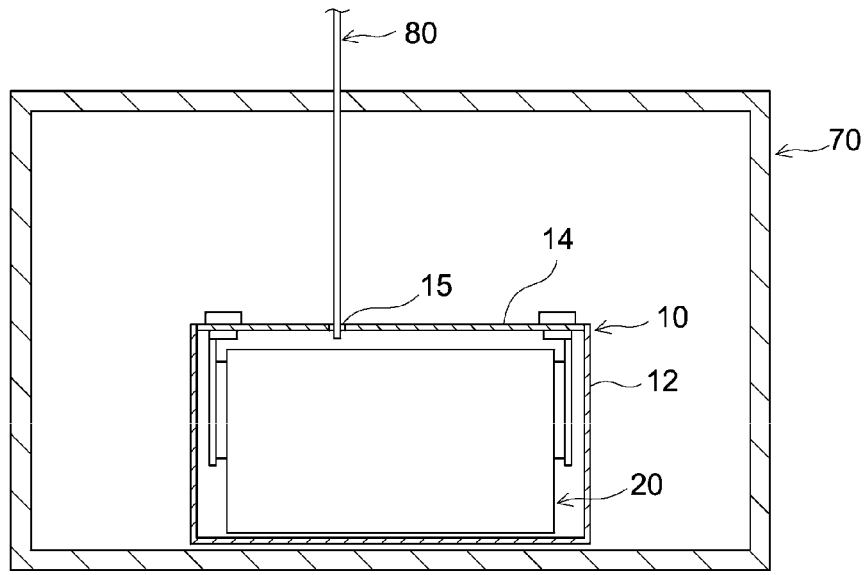
FIG. 5 is a schematic view for illustrating a part of the manufacturing method in accordance with First Embodiment.

FIG. 4 is a process view of a manufacturing method in accordance with First Embodiment. FIG. 5 is a schematic view for illustrating a part of the manufacturing method in accordance with First Embodiment. The manufacturing method includes, as shown in FIG. 4, the following steps S1 to S8: an electrode body accommodating step S1; a pressure reducing step S2; a solution introducing step S3; a communicating step S4; a temporarily sealing step S5; an impregnating step S6; an opening step S7; and a sealing step S8.

At the electrode body accommodating step S1, an electrode body is accommodated in a battery case. Specifically, for example, first, an electrode body 20 is manufactured by a conventionally known method. Then, the positive electrode internal terminal 50 is mounted at the positive electrode tab group 23 of the electrode body 20. Further, the negative electrode internal terminal 60 is mounted at the negative electrode tab group 25. Then, the positive electrode external terminal 30 and the negative electrode external terminal 40 are mounted at the lid body 14. The external terminals are joined with internal terminals of their respective same polarities with a conventionally known method (e.g., ultrasonic welding, resistance welding, or laser welding). Then, the electrode body 20 is accommodated in an electrode body holder made of a resin. Then, the electrode body 20 covered with the electrode body holder is inserted into the case main body. In this state, the lid body 14 is stacked on the opening part of the case main body 12, and these are welded, thereby sealing the case main body 12.

At the pressure reducing step S2, with the electrode body 20 accommodated in the battery case 10, the inside of the battery case 10 is set to negative pressure. Specifically, for example, first, the structure prepared at the step S1 is placed inside a chamber 70 as shown in FIG. 5. The chamber 70 is connected with a vacuum pump not shown. Then, the switch of the vacuum pump is turned on, and the pressure in the chamber 70 is reduced, thereby producing negative pressure. Although the pressure at this step has no particular restriction, the pressure can be set at, for example, −0.05 MPa or less, −0.08 MPa or less, or −0.09 MPa or less relative to the atmospheric pressure (0.1 MPa).

At the solution introducing step S3, with the inside of the battery case 10 set under negative pressure, a nonaqueous electrolyte is introduced into the inside of the battery case 10 via the solution introduction port 15. Specifically, for example, a piping 80 connected to the chamber 70 is connected with the solution introduction port 15 of the battery case 10, so that a nonaqueous electrolyte is introduced into the case main body 12. The piping 80 is a piping for solution introduction as described above, and is connected with the supply source of the nonaqueous electrolyte (e.g., a tank for accommodating a nonaqueous electrolyte therein). After the start of introduction of the nonaqueous electrolyte, with at least a part of the electrode body 20 immersed in the nonaqueous electrolyte, the solution introduction is stopped. In this step, a secondary battery assembly including the electrode body 20, the nonaqueous electrolyte, and the battery case 10 is constructed. Incidentally, the term "the secondary battery assembly" in the present specification means a structure having an electrode body, a nonaqueous electrolyte, and a battery case.

At the communicating step S4, after introducing the nonaqueous electrolyte, the inside of the battery case 10 and the external atmosphere are communicated with each other. Specifically, for example, after stopping the introduction of the nonaqueous electrolyte via the piping 80, the switch of the vacuum pump connected to the chamber 70 is turned off. At this step, for example, the piping 80 is removed from the solution introduction port 15. As a result, the battery case 10 can be opened to the external atmosphere via the opened solution introduction port 15. Alternatively, the battery case 10 may be opened to the external atmosphere without removing the piping 80, and therethrough. By opening the battery case 10 to the external atmosphere, it is possible to increase the pressure in the battery case 10. The battery case internal pressure can increase up to, for example, about the atmospheric pressure. In order to prepare the operation in the following steps after performing the communication, the secondary battery assembly may be taken out to the outside of the chamber 70.

Figure 6:
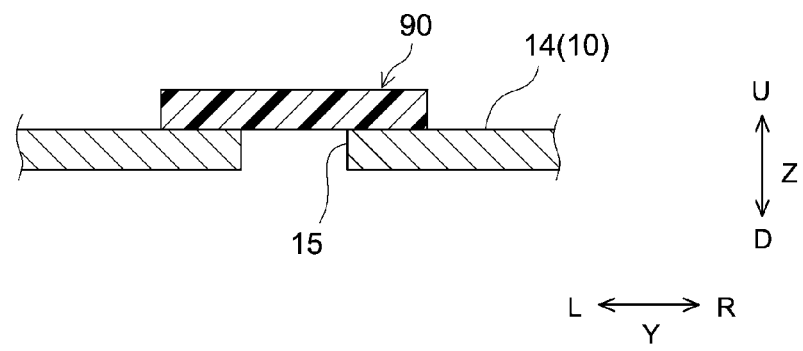
FIG. 6 is a partial cross sectional view showing a temporarily sealing step in the manufacturing method in accordance with First Embodiment.

At the temporarily sealing step S5, after the communication, using a first sealing member 90, the solution introduction port 15 is temporarily sealed. FIG. 6 is a partial cross sectional view showing a temporarily sealing step in the manufacturing method in accordance with First Embodiment. The first sealing member 90 has an air permeable film having air permeability. For this reason, the inside of the battery case 10 after temporary sealing and the external atmosphere can establish air permeability therebetween via the air permeable film. Herein, the term "film" means the structure extending in a planar shape. In other words, the term means the structure having the dimensions in the two directions (e.g., the X axis direction and the Y axis direction) at the film formed surface both smaller than the thickness of the film. In the present specification, the thickness of the "film" is, for example, 1000 μm or less, and may be 500 μm or less, and 250 μm or less.

In the present embodiment, as shown in FIG. 6, the first sealing member 90 includes an air permeable film. The first sealing member 90 is placed on the surface (the upper surface in the height direction Z) on the case outside of the lid body 14 of the battery case 10. The first sealing member 90 blocking the solution introduction port 15 is placed at the top of and around the solution introduction port 15. Namely, with the secondary battery assembly in the present step, an air permeable film as the first sealing member 90 is present at the top of and around the solution introduction port 15. Such a configuration can be kept until the first sealing member 90 is removed at the following step S7. The first sealing member 90 may be pasted on the surface of the lid body 14 using an adhesive, if required. The planar shape of the first sealing member 90 has no particular restriction so long as it blocks the solution introduction port 15.

The air permeable film can allow permeation of any of water vapor and vapor derived from the nonaqueous electrolyte therethrough. The permeability of water vapor and the vapor derived from the electrolyte can be evaluated based on, for example, the following test. In the test, first, two containers are prepared. Water is accommodated in one container, and a nonaqueous electrolyte is accommodated in the other container. With a prescribed amount of water or the nonaqueous electrolyte accommodated in the inside thereof, the opening parts of respective containers are blocked by the air permeable film. Then, respective containers are allowed to stand for a prescribed time. The amount, the time condition, the pressure condition, and the like of water or the nonaqueous electrolyte during the standing may be set the same as the conditions in the following impregnating step. Incidentally, in the present test, the container accommodating water therein and the container accommodating the nonaqueous electrolyte therein are placed under the same conditions, and are allowed to stand as described above.

After standing, the weight of the water or the nonaqueous electrolyte remaining in the container is measured.

Then, the permeation rate Tw (%) of water with respect to the air permeable film is calculated based on the following equation (1):

$$\text{Permeation rate } Tw\ (\%) = \text{weight of water after standing/weight of water before standing} \times 100 \quad (1)$$

Similarly, the permeation rate Te (%) of the nonaqueous electrolyte with respect to the air permeable film is calculated based on the following equation (2):

$$\text{Permeation rate } Te\ (\%) = \text{weight of nonaqueous electrolyte after standing/weight of nonaqueous electrolyte before standing} \times 100 \quad (2)$$

The permeation rate Tw (%) of water with respect to the air permeable film has no particular restriction, and can be set at, for example, 10 wt % or less. The permeation rate Te (%) of the vapor derived from the nonaqueous electrolyte with respect to the air permeable film can be set at, for example, 1 wt % or less, and is preferably 0.5 wt % or less, and more preferably 0.1 wt % or less, and is more desirably closer to zero.

The permeability of the vapor derived from the nonaqueous electrolyte with respect to the air permeable film is smaller than the permeability of water vapor with respect to the air permeable film. For example, when the permeability of water vapor is set at 1, the permeability of the vapor derived from the nonaqueous electrolyte is, for example, 0.1 or less, preferably 0.05 or less, more preferably 0.01 or less, and further preferably 0.005 or less, and is more desirably closer to zero. Namely, the permeation rate Te (%) of the nonaqueous electrolyte with respect to the air permeable film is smaller than the permeation rate Tw (%) of water, and the ratio (Te/Tw) of the permeation rate Te (%) and the permeation rate Tw (%) of water can satisfy the foregoing range.

The thickness of the air permeable film has no restriction so long as it can implement the effects of the technology herein disclosed. Namely, the thickness of the air permeable film can be appropriately set so as to implement the permeability of the water vapor and the permeability derived from the nonaqueous electrolyte as described above in accordance with the size of the electrode body, the amount of the nonaqueous electrolyte to be introduced, and various conditions at the impregnating step S6.

The constituent materials of the air permeable film have no particular restriction so long as the materials have the foregoing properties. For example, the air permeable film can include at least one resin material selected from the group consisting of polyethylene (PE), polypropylene (PP), polyphenylene sulfide (PPS), and polytetrafluoroethylene (PTFE). The air permeable film may be, for example, a film or a nonwoven fabric, and a commercially available product may be used.

At the impregnating step S6, with the solution introduction port 15 temporarily sealed, the electrode body 20 is impregnated with at least a part of the nonaqueous electrolyte. The communication increases the pressure in the battery case 10 up to a pressure comparable to that of the external atmosphere. Immediately after the communication, the pressure in the electrode body 20 is lower than the pressure in the battery case 10. For this reason, the difference in pressure can cause the nonaqueous electrolyte to be impregnated into the electrode body 20. At the present step, for example, until the nonaqueous electrolyte introduced into the battery case 10 is lowered to a prescribed height, the secondary battery assembly is allowed to stand under a prescribed pressure condition and temperature condition for a prescribed time. The pressure condition can be set comparable to that of the external atmosphere as described above, and is, for example, the atmospheric pressure. The temperature condition is, for example, 20° C. to 30° C., and can be set at about room temperature (25° C.).

Although depending upon the size of the secondary battery to be manufactured, the standing time can be set at, for example, 3 hours to 72 hours. The standing allows a part of the nonaqueous electrolyte introduced into the battery case 10 to volatilize. The allowable volatilization amount at the present step with the amount of the nonaqueous electrolyte to be introduced set at 100 wt % is, for example, 0.5 wt % or less. The standing time can be set so that the volatilization amount of the nonaqueous electrolyte is smaller than the allowable volatilization amount with the first sealing member 90 being used.

By performing temporary sealing using the first sealing member 90 including the air permeable film, it is possible to implement the effects of the technology herein disclosed. The mechanism thereof is considered by the present inventors as follows (for the reference numerals and signs, appropriately see the drawings). However, it is not intended that the present invention is limited to the mechanism described below. The nonaqueous electrolyte is, for example, impregnated into the electrode body 20 by the difference between the pressure Ps of the space outside the electrode body 20 in the battery case 10 and the pressure Pe in the electrode body 20 or the capillarity. At this step, the space in the electrode body 20 is reduced as the nonaqueous electrolyte is impregnated, so that the pressure Pe in the electrode body 20 increases, and the pressure Ps of the space in the battery case 10 decreases. Herein, when the member for performing temporary sealing does not have air permeability, the pressure Ps continues decreasing, and hence becomes lower than the pressure Pe. In that way, the pressure relationship between the space in the battery case 10 and the space in the electrode body 20 is reversed from the start of impregnation of the nonaqueous electrolyte. For this reason, the impregnation rate of the nonaqueous electrolyte into the electrode body 20 is reduced, resulting in degradation of the impregnation efficiency.

With the technology herein disclosed, the first sealing member for temporary sealing includes an air permeable film having air permeability, which allows air permeation between the inside of the battery case 10 and the external atmosphere. For this reason, even when the impregnation of the nonaqueous electrolyte into the electrode body 20 proceeds, the pressure Ps becomes less likely to decrease. As a result of this, it is possible to improve the impregnation efficiency. Further, the air permeable film is configured so that the permeability of the vapor derived from the nonaqueous electrolyte is reduced. Even when air permeation is established between the inside of the battery case 10 and the external atmosphere, it is possible to suppress the volatilization of the vapor derived from the nonaqueous electrolyte. For this reason, at the step S6, the standing time for impregnating the nonaqueous electrolyte into the electrode body 20 can be prolonged. Also with this configuration, it is possible to improve the impregnation efficiency.

At the opening step S7, the first sealing member 90 is removed, and the solution introduction port 15 is opened. Specifically, for example, by peeling the first sealing member 90 (in the present embodiment, the air permeable film), the solution introduction port 15 is opened. In the secondary battery assembly which has gone through the step S7, the residue of the air permeable film as the first sealing member 90 can be present at the internal circumference and/or around the solution introduction port 15.

At the sealing step S8, using the second sealing member 16, the solution introduction port 15 is sealed. As the second sealing member 16, the sealing member for use in this kind of secondary battery can be used without particular restriction. As one example thereof, a sealing stopper made of a metal is used as the second sealing member 16, and the sealing stopper is fitted into the solution introduction port 15. Then, with the solution introduction port 15 blocked by the second sealing member 16, laser welding or the like is performed, thereby sealing the solution introduction port 15. Thereafter, under prescribed conditions, the secondary battery 100 is subjected to initial charging and an aging treatment, and thereby can be put into a usable state. Incidentally, the secondary battery assembly herein disclosed includes the secondary battery assembly in the manufacturing process of the step S5 to the step S8, and the secondary battery put into a usable state.

The secondary battery 100 is usable for various uses. As preferable uses thereof, mention may be made of driving power supply to be mounted on a vehicle such as a battery electric vehicle (BEV), a hybrid electric vehicle (HEV), or a plug-in hybrid electric vehicle (PHEV). Further, the secondary battery 100 can be used as a storage battery such as a compact electric power storage device. The secondary battery 100 is typically also usable in a form of an assembled battery including a plurality of batteries connected in series and/or in parallel with one another.

The foregoing First Embodiment is merely one example of the manufacturing method and the secondary battery assembly herein disclosed. The technology herein disclosed can be carried out in another form. Below, a description will be given to other embodiments of the technology herein disclosed.

Second Embodiment

Figure 7:
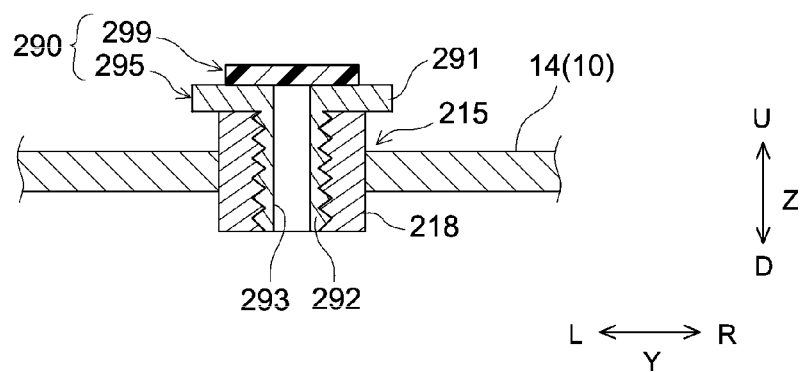
FIG. 7 is a partial cross sectional view showing a temporarily sealing step in a manufacturing method in accordance with Second Embodiment.

In the First Embodiment, the first sealing member 90 includes an air permeable film. However, it may only be configured such that the first sealing member includes the air permeable film, and such that the air permeable film allows air permeation between the battery case 10 and the external atmosphere. For this reason, the configuration of the first sealing member is not limited thereto. As one example, a first sealing member 290 having the configuration shown in FIG. 7 is also usable. FIG. 7 is a partial cross sectional view showing a temporarily sealing step in the manufacturing method in accordance with Second Embodiment. The first sealing member 290 has a sealing stopper main body 295 and an air permeable film 299. The sealing stopper main body 295 has a base part 291 and a tube part 292. The base part 291 is in a flat sheet shape, and has a through hole. The planar shape of the base part 291 has no particular restriction, and may be rectangular, or may be circular. The tube part 292 is in a hollow cylindrical shape, and extends from the base part 291 to the lower side in the height direction Z (D side). The outer circumference of the tube part 292 is subjected to threading processing. The through hole of the base part 291 and the tube part 292 are coupled with each other, thereby forming a through hole 293 in the sealing stopper main body 295. Namely, the sealing stopper main body 295 has the through hole 293, and is in a hollow cylindrical shape.

The air permeable film 299 blocks the through hole 293 of the sealing stopper main body 295. Specifically, as shown in FIG. 7, the air permeable film 299 is provided on the upper surface of the base part 291, and covers the upper end of the through hole 293.

As shown in FIG. 7, the tube part 292 of the first sealing member 290 is threadedly engaged with the solution introduction port 215. Specifically, the inner circumferential surface of the solution introduction port 215 is provided with a coupling member 218 in a hollow cylindrical shape in order to threadedly engage the second sealing member with the solution introduction port 215 at the step S8. The coupling member 218 may be used for threaded engagement with the first sealing member 290. The inner circumferential surface of the coupling member 218 is subjected to threading processing. The tube part 292 of the sealing stopper main body 295 is inserted into the hollow inside of the coupling member 218. Herein, the tube part 292 and the coupling member 218 are threadedly engaged with each other. The upper end of the coupling member 218 is in contact with the lower surface of the base part 291.

In Second Embodiment, as described above, at the sealing step S8, as the second sealing member, a sealing stopper, or the like subjected to threading processing so as to be threadedly engaged with the inner circumference of the coupling member 218 can be used. The configuration of the first sealing member 290 and the solution introduction port 215 adopted in Second Embodiment can enhance the impregnation efficiency of the nonaqueous electrolyte into the electrode body 20, and can more facilitate removal of the first sealing member 290. Further, the first sealing member 290 can be reused after removal. Incidentally, the method for manufacturing a secondary battery in accordance with Second Embodiment may be the same as the manufacturing method in accordance with First Embodiment except for the foregoing points.

Third Embodiment

In the Second Embodiment, the air permeable film 299 was provided on the upper end face of the base part 291 of the first sealing member 290 in a hollow cylindrical shape. However, the portion at which the air permeable film 299 is provided has no particular restriction so long as the hollow of the first sealing member 290 can be blocked. For example, the following configuration is also acceptable: the air permeable film 299 is provided in the inside of the through hole 293 of the sealing stopper main body 295 in a hollow cylindrical shape, thereby blocking the hollow inside of the first sealing member 290.

Up to this point, specific examples of the technology herein disclosed have been described in details. However, these are merely illustrative, and should not construed as limiting the scope of the appended claims. The technology herein disclosed includes various modifications and changes of the specific examples. For example, the technology herein disclosed is also applicable to a sodium ion secondary battery. Further, the technology herein disclosed is also applicable to a secondary battery including a laminated electrode body.

What is claimed is:

1. A method for manufacturing a secondary battery, the secondary battery comprising:
   an electrode body comprising a positive electrode and a negative electrode;
   a nonaqueous electrolyte; and
   a battery case for accommodating the electrode body and the nonaqueous electrolyte therein, and having a solution introduction port for introducing the nonaqueous electrolyte,
   the method comprising:
   producing a negative pressure in an inside of the battery case with the electrode body accommodated in the battery case;
   introducing the nonaqueous electrolyte into the inside of the battery case via the solution introduction port with the inside of the battery case under the negative pressure;
   establishing communication between the inside of the battery case and external atmosphere after introducing the nonaqueous electrolyte to bring the inside of the battery case to atmospheric pressure;
   temporarily sealing the solution introduction port using a first sealing member after the communication between the inside of the battery case and the external atmosphere has been established and the inside of the battery case is at atmospheric pressure;
   impregnating the electrode body with at least a part of the nonaqueous electrolyte with the solution introduction port temporarily sealed while maintaining the communication with the external atmosphere and maintaining the inside of the battery case at atmospheric pressure;
   removing the first sealing member, and opening the solution introduction port while maintaining the communication with the external atmosphere and maintaining the inside of the battery case at atmospheric pressure; and
   sealing the solution introduction port using a second sealing member,
   wherein the first sealing member comprises an air permeable film having air permeability,
   air permeation is enabled between the inside of the battery case after the temporary sealing and the external atmosphere via the air permeable film to maintain the inside of the battery case at atmospheric pressure, and
   a permeability of a vapor derived from the nonaqueous electrolyte with respect to the air permeable film is smaller than a permeability of water vapor with respect to the air permeable film.

2. The manufacturing method according to claim 1, wherein the first sealing member comprises a sealing stopper main body having a through hole, and the air permeable film, and
   the air permeable film blocks the through hole of the sealing stopper main body.

3. The manufacturing method according to claim 1, the positive electrode being a long band-shaped positive electrode sheet,
   the negative electrode being a long band-shaped negative electrode sheet, and
   the electrode body being a wound electrode body comprising the positive electrode sheet and the negative electrode sheet stacked one on another with a separator interposed therebetween, and wound around a winding axis orthogonal to a sheet longitudinal direction as a center,
   wherein a lamination surface of the positive electrode sheet, the negative electrode sheet, and the separator is opened from both ends in the winding axis direction to outside of the electrode body.

4. The manufacturing method according to claim 1, wherein the air permeable film comprises at least one resin material selected from the group consisting of polyethylene, polypropylene, polyphenylene sulfide, and polytetrafluoroethylene.

5. The manufacturing method according to claim 1, wherein the first sealing member comprises a sealing stopper main body comprising a base part, wherein the base part has a flat sheet shape and a through hole defined through the base part, and a tube part extending from the base part, wherein the tube part has a hollow cylindrical shape with an opening defined through the tube part; and
   wherein the air permeable film of the first sealing member is one of arranged on an upper surface of the base part to cover the through hole defined through the base part or arranged inside the opening defined through the tube part to block the opening.

* * * * *